(No Model.)
C. E. MOORE.
ELECTRIC BRAKE MECHANISM FOR ELEVATORS.
No. 468,917.                    Patented Feb. 16, 1892.
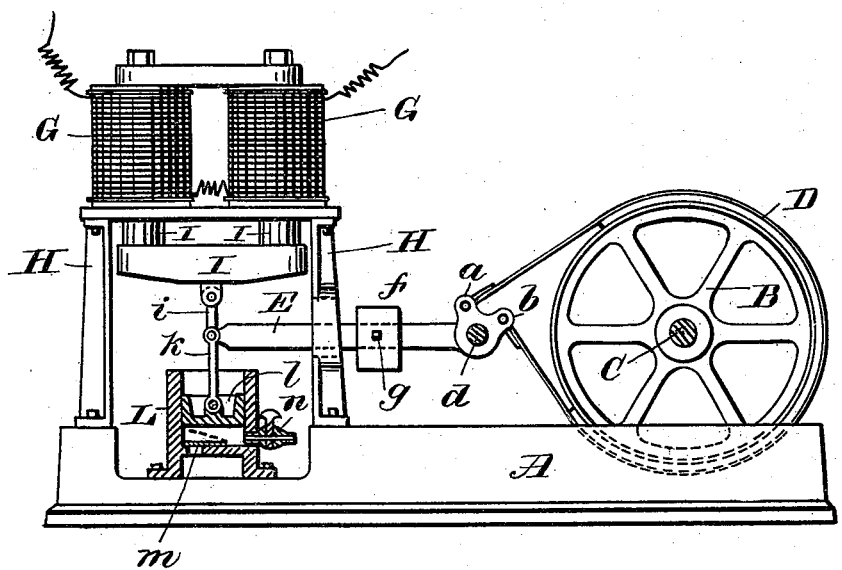
WITNESSES:                          INVENTOR
                                    Charles E. Moore
                                    BY
                                    ATTORNEY.

UNITED STATES PATENT OFFICE.

CHARLES E. MOORE, OF BOSTON, MASSACHUSETTS.

ELECTRIC BRAKE MECHANISM FOR ELEVATORS.

SPECIFICATION forming part of Letters Patent No. 468,917, dated February 16, 1892.

Application filed November 4, 1891. Serial No. 410,856. (No model.)

*To all whom it may concern:*

Be it known that I, CHARLES E. MOORE, a citizen of the United States, residing at Boston, in the county of Suffolk and State of Massachusetts, have invented an Improvement in Electric Brake Mechanism for Elevators, of which the following is a full, clear, and exact description, reference being had to the accompanying drawings, making part of this specification, in which is represented a side elevation of an electric brake mechanism embodying my invention.

My invention relates to an improvement in electric brake mechanism for elevators, and has for its object to enable the brake to be applied gradually, whereby the sudden shock to the machinery incident to the instantaneous application of the brake is avoided.

To this end my invention consists in the combination, with the brake and brake-actuating mechanism and an electro-magnet connected therewith, of a dash-pot or retarding device adapted to retard and automatically control the movement of the brake-actuating mechanism connected therewith, whereby a gradual application of the brake is effected, as hereinafter more fully set forth.

In the drawings, A represents the bed-plate of an elevator.

B is the brake-wheel, which is preferably secured to the main driving or motor shaft C.

D is the brake or gripping-band, which encircles the brake-wheel B and is pivoted at its opposite ends to the two arms or branches $a$ $b$ of the brake lever or bar E, fulcrumed on a shaft $d$, and preferably provided with an adjustable weight $f$, adapted to be secured, when adjusted, by means of a set-screw $g$.

G is an electro-magnet, preferably a solenoid, which is secured to and supported by standards H H, rising from the bed-plate A, the armature I, which is preferably made of considerable weight, being connected by a link or short rod $i$ to the long arm of the brake-lever E, whereby, when the circuit through the magnet is broken and the armature released, it will descend by gravitation, thereby depressing the long arm of the brake-lever, which, through the connections described, will apply the brake to the wheel B, as desired.

To prevent the too-sudden descent of the armature and brake-lever, the latter is connected by means of a rod $k$, pivoted thereto in line with the rod $i$, with a piston or plunger $l$ working within an air-cylinder or dash-pot L, provided at its bottom with an upwardly-opening air-inlet valve $m$, through which the air is admitted as the piston $l$ is drawn up by the armature I when attracted by the closing of the electric circuit through the magnet, the cylinder being also provided with an outlet controlled by a petcock $n$, which may be opened by hand more or less to accelerate or retard the escape of the air, and thus regulate the descent of the piston, the rapidity of which will depend upon the extent to which the petcock is opened to permit the escape of air from the cylinder, which can thus be regulated and controlled in such manner as to cause the power exerted by the armature in its descent to be applied to the brake-lever and brake so gradually as to avoid all shock to the machinery, whereby liability of injury from this cause is avoided.

I do not confine myself to the employment of a brake and brake-actuating lever constructed as above described, as it is evident that my improvement can be applied to any brake mechanism which is adapted to be operated by the weight and momentum of the armature of an electro-magnet connected therewith when said armature is released by the breaking of the electric circuit.

It will be obvious that a dash-pot or retarding device of any suitable construction—for instance, a dash-pot adapted to contain oil or other liquid—may be employed in lieu of the air-cylinder and piston above described without departing from the spirit of my invention.

The operation of the above-described brake mechanism is as follows: On the electric circuit being completed through the electro-magnet the armature I will be raised, carrying with it the brake-lever E, and thereby removing the brake from the wheel B. At the same time the piston $l$ of the dash-pot L will be raised, drawing in a fresh supply of air through the valve $m$. Immediately on the breaking of the circuit through the electro-magnet, which is accomplished simultaneously with the cutting off of the current from the motor, the amature I will drop, carrying with it the brake-lever E, which then applies the brake gradually in proportion to the speed with which it is permitted to descend by the dash-pot L, as before described.

My improvement presents a great advantage over the ordinary electric brake mechanism as heretofore constructed, in which the weight and momentum of the falling armature is caused to act instantaneously upon the brake-lever without any retarding device, as in the latter case a sudden and injurious shock is experienced, which is exceedingly undesirable in the operation of hoisting machinery, and which is entirely avoided by the use of my improvement.

What I claim as my invention, and desire to secure by Letters Patent, is—

1. In an electric brake mechanism, the combination, with a brake, its actuating mechanism, and an electro-magnet connected therewith, of a dash-pot or retarding device adapted to retard and automatically control the movement of the brake-actuating mechanism to effect a gradual application of the brake, substantially as set forth.

2. In an electric brake mechanism, the combination, with the brake, its actuating mechanism, and an electro-magnet connected therewith, of an air-cylinder or dash-pot provided with an air-inlet valve $m$ and a petcock $n$ and having its piston connected with the armature of the electro-magnet and the brake-actuating mechanism, substantially as and for the purpose set forth.

3. In an electric brake mechanism, the combination of the brake-wheel B, the brake or gripping-band D, the brake-lever E, with its adjustable weight $f$, the electro-magnet G, and the air-cylinder or dash-pot L, having its piston connected with the armature of the electro-magnet and the brake-lever by suitable rods $i$ $k$, said cylinder L being provided with an inlet-valve $m$ and an outlet controlled by a petcock $n$, all constructed to operate substantially in the manner and for the purpose set forth.

Witness my hand this 26th day of October, A. D. 1891.

CHARLES E. MOORE.

In presence of—
P. E. TESCHEMACHER,
HARRY W. AIKEN.